United States Patent

[11] 3,575,141

[72] Inventor Frederick R. Elkins
 3201 W. Caperton St., Shreveport, La. 71109
[21] Appl. No. 864,687
[22] Filed Oct. 8, 1969
[45] Patented Apr. 20, 1971

[54] ANIMAL FEEDER
 10 Claims, 7 Drawing Figs.
[52] U.S. Cl. .................................................. 119/55, 119/62
[51] Int. Cl. ............................................... A01k 05/02
[50] Field of Search .......................................... 119/53.5, 62, 55

[56] References Cited
UNITED STATES PATENTS

| | | | |
|---|---|---|---|
| 1,062,610 | 5/1913 | Schisler ...................... | 119/55 |
| 1,449,485 | 3/1923 | Alspach ...................... | 119/55 |
| 3,241,525 | 3/1966 | Meier ......................... | 119/55 |

Primary Examiner—Aldrich F. Medbery
Attorney—Brady, O'Boyle and Gates

ABSTRACT: A single or plural unit animal feeder particularly for dogs and cats which is substantially rodentproof and weathertight and is further characterized by the absence of springs and moving linkages. The device is sturdy in construction and knocks down readily for shipment and is very reliable in operation. A sliding access door to a feed box is biased upwardly by a counterweighted pivoted platform which operates under the weight of the animal to slide the door downwardly to a feeding position.

PATENTED APR 20 1971 3,575,141

INVENTOR
FREDRICK R. ELKINS

BY Brady, O'Boyle & Gates

ATTORNEYS

INVENTOR
FREDRICK R. ELKINS

BY Brady, O'Boyle & Gates
ATTORNEYS

ANIMAL FEEDER

Various animal feeders are known in the prior art including some which respond to the weight of an animal on a treadle for operating a feed box closure. However, in general, the prior art devices are too complicated to be entirely satisfactory and are too bulky for ready packaging and shipping and insufficient provision is made for separating the parts for shipment. Additionally, the feeders commonly employ springs and moving linkages which may rust and bind during the use and sometimes present awkward assembly problems to the purchaser of the feeder.

The aim of the present invention is therefore to provide an improved and greatly simplified feeder which is free of the defects of prior art devices and which is economical to manufacture and very durable and reliable in operation. The feeder, according to the invention, is comprised of a minimum number of operating parts and has no springs, levers or linkages other than a single vertically sliding feed box access door and counterweighted platform having a unique operating connection with the access door. Provision is made to render the feed box or hopper substantially weathertight and to exclude rodents and other small animals. An important feature is that the feeder can be knocked down into four major components for ease of shipping and storage. The feeder is constructed so that the animal can operate the access door without difficulty by merely stepping onto the platform and the door is self-closing under influence of the counterweighted platform. Other features and advantages of the invention will appear during the course of the following description.

BRIEF DESCRIPTION OF DRAWING FIGURES

DETAILED DESCRIPTION

Figure 1:
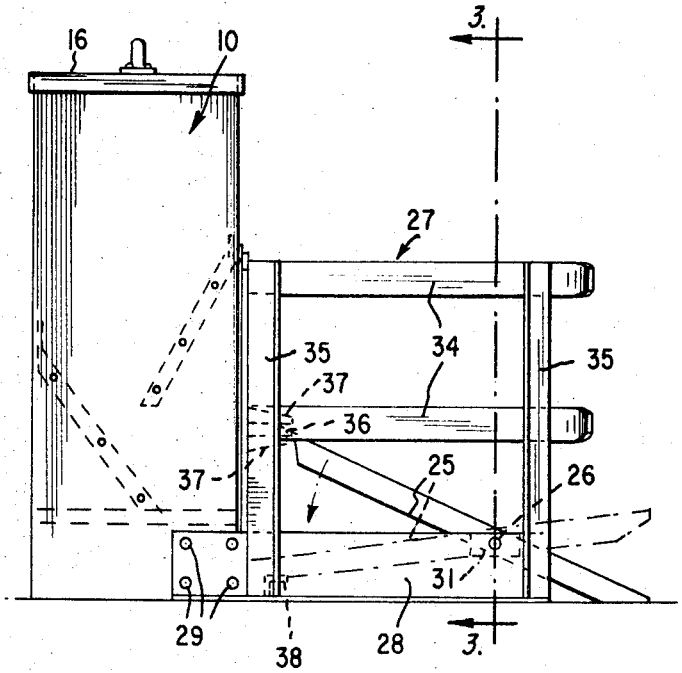
FIG. 1 is a side elevation of an animal feeder embodying the invention.

Referring to the drawings in detail, wherein like numerals designate like parts throughout the same, the numeral 10 designates a rectangular upstanding feed box or hopper for a suitable granular animal feed 11. The hopper 10 has secured therein inclined a baffle plates 12 and 13, causing the feed to flow into a lower feeding chamber 14 near the elevation of the animal's head, such as a dog or cat. The hopper has a bottom wall 15 somewhat elevated from the ground helping to render the same rodentproof and the hopper also has a removable closure or lid 16 on its upper end, as shown.

Figure 5:
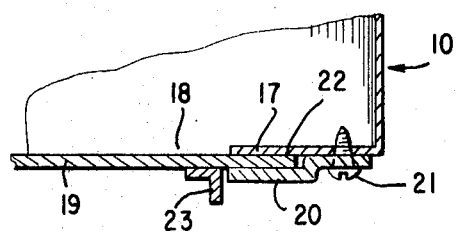
FIG. 5 is an enlarged fragmentary horizontal section taken on line 5-5 of FIG. 3.
Figure 6:
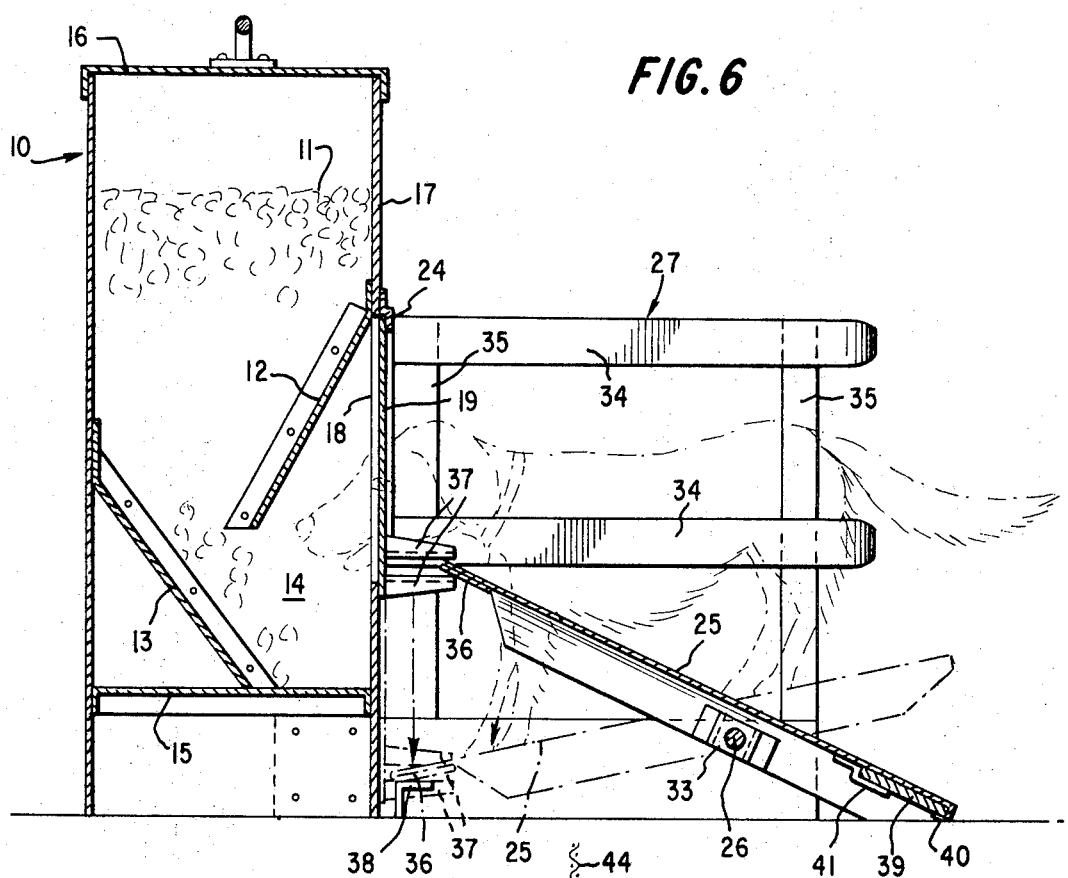
FIG. 6 is an enlarged central vertical section through the feeder taken on line 6-6 of FIG. 2 and showing the pivoted platform in two extreme operating positions.

On its forward vertical wall 17, the box or hopper 10 has a rectangular feed opening 18 of substantial size normally covered by a vertically sliding animal-operated door 19 or panel. At its opposite vertical edge, the door has its front face overlapped by weather stripping and guide plates 20 secured as at 21, FIG. 5, to the hopper front wall 17. The vertical edge portions of the door 19 slide smoothly in the channel passages 22 formed between the plates 20 and wall 17. To eliminate any tendency for the sliding door to become cocked or to bind, there is provided thereon a pair of vertical parallel exterior bars 23 in closely spaced relation to the edges of guide plates 20 and adapted to contact such edges to prevent the door from binding and assure a free vertical sliding movement for the door. At the top of opening 18, FIG. 6, an additional weather strip plate 24 extends transversely across the hopper and receives behind it the top edge of the door 19 when the latter is in its normal elevated or closed position under the influence of counterweight means yet to be described. Thus, the feed hopper is rendered quite weathertight and the elevation of the feed opening 18 helps to exclude rodents or other small animals.

The feeder additionally comprises a pivoted platform or treadle 25 which is rectangular and is pivoted intermediate its ends upon a horizontal pivot shaft 26, the ends of which are supported on the lower portions of entrance guide rail units 27. More particularly, each entrance guide rail unit 27 has a lower sturdy angle bar 28 at ground level whose rearward end portion is firmly detachably secured to the adjacent sidewall of the hopper 10 by four bolts 29 or the like. The pivot shaft 26 is received by openings 30 in the bars 28 and is further supported by bearing elements 31 secured to the inner faces of the bars 28.

The platform 25 is disposed between the bars 28 and bearings 31 and is provided in its sides with openings 32 to receive the shaft 26 and carries additional bearing elements 33 which receive the shaft 26 and support the platform pivotally thereon quite securely. Above the bars 28, the entrance guide rail units 27 consist of several vertically spaced horizontal rails 34, secured to vertical bars 35 whose lower ends are suitably anchored to the bars 28 so as to form a rigid assembly. The units 27 form an entrance passageway through which the animal must pass when stepping onto the pivoted platform 25. It will be noted that the rail units 27 are quickly detachable from the hopper 10 by simply removing the bolts 29 at each side of the hopper and the platform 25 is separable from the rail units 27 by simply removing the pivot shaft 26. This enables the feeder to be separated into only four major pieces for ease of shipment and storage and the parts are extremely easy to set up or assemble for use.

Figure 3:
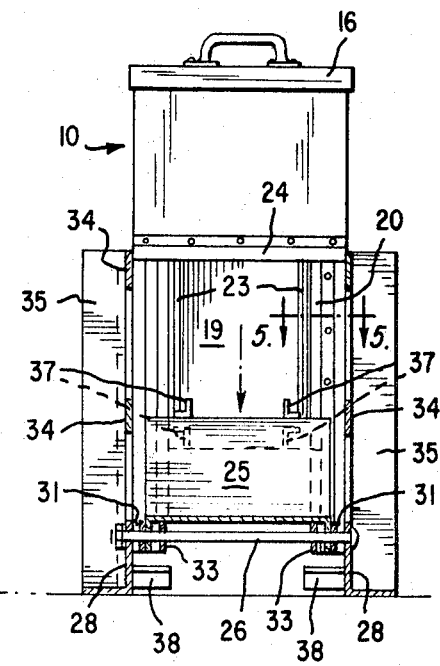
FIG. 3 is a vertical section taken on line 3-3 of FIG. 1.
Figure 2:
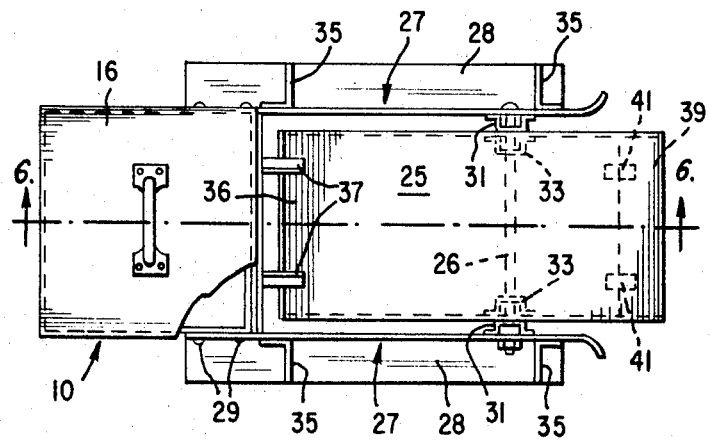
FIG. 2 is a plan view thereof.
Figure 4:
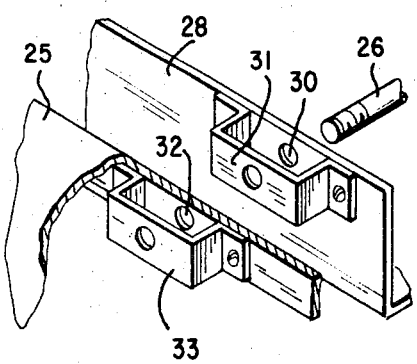
FIG. 4 is an enlarged exploded perspective view of a platform pivot and bearing means.

The leading end of the platform 25 is folded upon itself as at 36 for strength and this leading end portion engages between pairs of vertically spaced lugs or operators 37 rigidly secured to the forward side of the sliding door 19 in laterally spaced relation. The projecting portion 36 or lip of the pivoted platform thus has a form of pivotal sliding or camlike connection through the lugs 37 with the door 19 to operate the same. This simple connection eliminates the use of cranks or links or other like elements which may become bound up due to bending and rough usage or may become separated and lost after a period of time. In all positions of the sliding door 19, the lip 36 of the platform will remain engaged between the lugs 37, as illustrated, and the operation of the sliding door under influence of the platform is very smooth and reliable. Upward movement of the door 19 is arrested by the plate 24 and downward movement of the platform 25 is limited by contact with a pair of stop elements 38 which may be rigidly secured to the bars 28, FIG. 3.

The rearward end of platform 25 on the opposite side of pivot shaft 26 carries a suitable counterweight bar 39 on its lower side, extending thereacross, and supported by an integral flange 40 of the platform and several brackets 41 on the bottom surface of the platform. The counterweight 39 is sufficient to bias the platform normally to the inclined door closing position, shown in FIG. 6, when there is no animal's weight upon the platform. At this time, the opening 18 is closed completely and sealed. When the animal, such as a cat or dog, steps onto the platform or treadle 25 seeking food, its weight forwardly of the pivot shaft 26 will overcome the effect of counterweight 39 and swing the platform to the door lowering or opening position shown in broken lines in FIGS. 6 and 1, at which time the opening 18 is substantially completely open and the animal can thrust its head into the feed chamber 14 without difficulty. The platform lip 36 will now engage the limit stops 38, FIG. 6. When the dog steps off the platform, the counterweight 39 will automatically return the platform to the door closing position.

In the case of small pets, the provision of the railing units 27 assures that the pet after feeding will not step off the side of the platform but will leave the end of the platform. In the case of a feeder designed for small pets, the weight of the pet may be necessary to aid the counterweight in closing the feeder door 19. The pivot shaft 26 is located nearer the counterweighted end of the platform than the other end to assure that the weight of the animal will be concentrated sufficiently beyond the pivot to effect lowering of the door 19 in all cases. A feature of the device preventing spillage of feed and the entry of small rodents and the like is the relatively high elevation of the opening 18 coupled with the fact that the door 19 elevates to close the feed opening and slide downwardly to open it.

Figure 7:
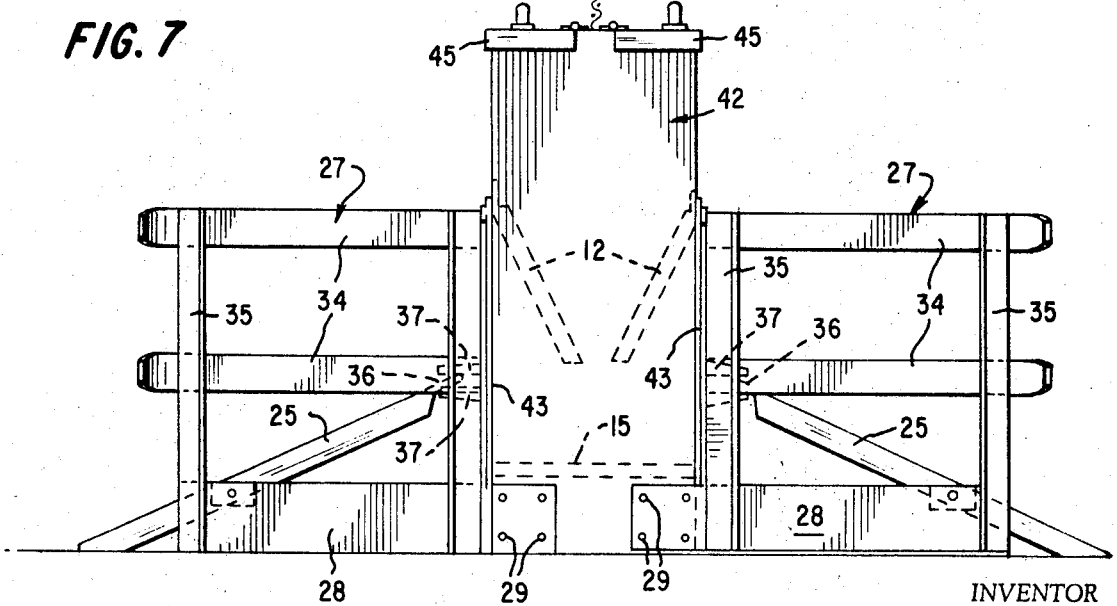
FIG. 7 is a side elevational view of a twin unit feeder embodying the invention in accordance with a modification and with parts omitted for simplicity.

FIG. 7 illustrates a dual feed unit of the invention comprising a single feed box or hopper 42 having vertically sliding feed doors 43 on the opposite sides thereof so that animals in separate pens separated by a fence 44 can feed from the same hopper. The identical arrangement of operating platforms 25 is provided in the dual unit and the identical arrangement of entrance rail units are provided on the opposite sides of the feeder and these components have already been described in detail and need not be redescribed. The top of the hopper 42 may be equipped on opposite sides of the fence 44 with separate hinged lids 45, to facilitate filling the hopper from either side of the fence. All other parts and their operations are identical with corresponding parts shown and described in connection with the prior embodiment.

It is to be understood that the forms of the invention herewith shown and described are to be taken as preferred examples of the same, and that various changes in shape, size and arrangement of parts may be resorted to, without departing from the spirit of the invention.

I claim:

1. An animal feeder comprising a feed hopper having a sidewall feed opening, a feed opening closure panel slidably mounted on said sidewall and covering the feed opening when in a raised position and exposing the opening when in a lowered position, a pivoted treadle on the feeder beyond the side thereof having the feed opening and adapted to beat the weight of an animal seeking food, means forming a direct sliding pivotal connection between the leading end of the treadle and said closure panel, and counterweight means on the treadle biasing the treadle normally to a position elevating the closure panel so as to cover said feed opening, said means comprising a transverse lip on the leading end of the treadle, and vertically spaced lug elements on the exterior of the closure panel defining a slot slidably receiving said lip.

2. The structure of claim 1 and said treadle is a rectangular platform and said lip is formed along the leading transverse edge of the platform, said lugs comprising laterally spaced pairs of lugs on the closure panel.

3. The structure of claim 1, and a pair of laterally spaced entrance guide rail units detachably secured to opposite sides of the feed hopper on opposite sides of the pivoted treadle.

4. The structure of claim 3 and combined guiding and weather stripping elements for the sliding closure panel on the feed hopper adjacent the sides and the top of the feed opening.

5. The structure of claim 4, and limit stop means to arrest downward movement of the leading end of the treadle on said entrance guide rail units.

6. The structure of claim 1, and said counterweight means comprising a counterweight bar on the bottom of the treadle near its end remote from the feed hopper, and elements securing the counterweight bar to the treadle.

7. The structure of claim 1, and a pair of spaced entrance guide rail units connected with said hopper on opposite sides of the treadle, a transverse pivot shaft for the treadle on said rail units near their bottoms and spaced substantially from the hopper.

8. The structure of claim 7, and support bearing elements for the pivot shaft and treadle on the treadle and rail units in alignment.

9. An animal feeder as defined in claim 1, and said hopper having a feed opening in a pair of opposite sides thereof, a pair of closure panels one for each said feed openings slidably engaging the hopper, and a separate pivoted treadle for each closure panel directly slidably contacting the same and being counterweighted to normally elevate the associated closure panel into covering relationship with the adjacent feed opening.

10. The structure of claim 9, and a pair of spaced entrance rail units connected with the opposite sides of the hopper having the feed openings and upon which said treadles are pivotally mounted.